United States Patent
McGwin, Jr.

(10) Patent No.: US 7,552,057 B2
(45) Date of Patent: Jun. 23, 2009

(54) METHOD AND APPARATUS FOR USING PROCESS EXCEPTIONS TO PROVIDE INSTANT NOTIFICATIONS FOR DISTRIBUTED PROCESSES

(76) Inventor: James E. McGwin, Jr., 412 Chimney Rock Dr., North Kingstown, RI (US) 02852

( * ) Notice: Subject to any disclaimer, the term of this patent is extended or adjusted under 35 U.S.C. 154(b) by 525 days.

(21) Appl. No.: 10/090,647

(22) Filed: Mar. 4, 2002

(65) Prior Publication Data
US 2002/0147609 A1 Oct. 10, 2002

Related U.S. Application Data (60) Provisional application No. 60/272,876, filed on Mar. 2, 2001, provisional application No. 60/359,007, filed on Feb. 21, 2002.

(51) Int. Cl.
*G06Q 99/00* (2006.01)
(52) U.S. Cl. ............................................................ 705/1
(58) Field of Classification Search ............... 705/1
See application file for complete search history.

(56) References Cited

U.S. PATENT DOCUMENTS

| | | | |
|---|---|---|---|
| 5,748,884 A * | 5/1998 | Royce et al. | 714/57 |
| 6,671,818 B1 * | 12/2003 | Mikurak | 714/4 |
| 6,678,684 B1 * | 1/2004 | Koga et al. | 707/10 |
| 6,757,689 B2 * | 6/2004 | Battas et al. | 707/101 |
| 6,842,772 B1 * | 1/2005 | Delaney et al. | 709/206 |
| 6,857,017 B1 * | 2/2005 | Faour et al. | 709/224 |
| 6,868,387 B1 * | 3/2005 | Krueger et al. | 705/7 |
| 6,999,565 B1 * | 2/2006 | Delaney et al. | 379/88.13 |
| 2002/0019759 A1 * | 2/2002 | Arunapuram et al. | 705/7 |
| 2002/0046299 A1 * | 4/2002 | Lefeber et al. | 709/318 |
| 2002/0087740 A1 * | 7/2002 | Castanho et al. | 709/318 |
| 2002/0107864 A1 * | 8/2002 | Battas et al. | 707/101 |
| 2002/0107957 A1 * | 8/2002 | Zargham et al. | 709/224 |
| 2002/0143669 A1 * | 10/2002 | Scheer | 705/28 |
| 2002/0147622 A1 * | 10/2002 | Drolet et al. | 705/7 |
| 2005/0060245 A1 * | 3/2005 | Hoffman et al. | 705/28 |

* cited by examiner

*Primary Examiner*—Jonathan Ouellette
(74) *Attorney, Agent, or Firm*—The Marbury Law Group, PLLC (57) ABSTRACT

The present invention is drawn to a method and apparatus for using process exceptions to provide instant notifications for distributed processes. Process exception detection means are set-up at critical points in a process. The process exception detection means can be implemented using separate hardware, such as a PDA, or using software code added to existing systems, such as machine controllers. The process exception detection means monitors stimulus from information sources to detect exceptions that are then communicated to messaging controllers. The messaging controllers process the exception to instantly send a notification and the contextual information needed to respond to the notification to an appropriate recipient. Escalating communication schemes are used for both exceptions and notifications to further fault tolerance.

14 Claims, 5 Drawing Sheets

METHOD AND APPARATUS FOR USING PROCESS EXCEPTIONS TO PROVIDE INSTANT NOTIFICATIONS FOR DISTRIBUTED PROCESSES

RELATED APPLICATIONS

This application claims the benefit of Provisional Application Ser. Nos. 60/272,876, filed Mar. 2, 2001, and 60/359,007, filed Feb. 21, 2002, both of which are incorporated herein in their entirety.

FIELD OF THE INVENTION

The present invention is drawn to the application of process exception detection means, such a Digital Enzyme™, available from Collaboration Catalyst Corporation, 412 Chimney Rock, North Kingstown, R.I. 02852. The process exception detection means is an application or set of code that is deployed and gathers process data at critical points so as to be able to react to situations. For example, when pre-specified conditions are met, data about the situation and its environment can be transmitted to a central location, where choices will be made about whom to notify about the situation, along with relevant context, allowing those notified to understand the situation in the appropriate context and therefore be able to make informed decisions in order to react appropriately to that situation. In a preferred embodiment, the present invention relates to a method and apparatus for detecting pre-defined supply chain conditions, and informing appropriate recipients of these conditions along with relevant information to allow them to respond to the condition appropriately.

BACKGROUND OF THE INVENTION

The present state of the art in a supply chain is that often the first time that a problem is detected in when the manufactured item is delivered, and it is determined to be of insufficient quality, or it is not delivered when it was promised.

The present state of the art does not solve certain problems that need to be solved. Detection of unusual conditions is either performed manually, or it requires significant inter-application integration; if the applications reside in different enterprises (where someone in a customer company desires to know something happening in the manufacturing supplier) additional inter-enterprise, inter-application problems arise, not the least of which involves security of information access and information transfer.

What would really be useful is a device or process that is able to detect exception conditions in a manufacturing supply chain, with a process that is minimally invasive to the existing applications and devices that comprise the supply chain, and then inform one or more recipients, determined by the specific condition detected, instantly, and with each notification provide the users with relevant context to allow them to react to the original exception, either to fix the problem, or to provide an alternative solution to the problem, such as locating an alternative manufacturing supplier. The notification may take place wholly within an enterprise, or might cross enterprise boundaries; in the latter case, it is important that only information relevant to the pair of enterprises (e.g., customer and supplier) be allowed to be transmitted across the network connecting the enterprises. Also, it would be useful if the communications can occur via a variety of media; that there would be an escalation mechanism if notification is not acknowledged within a pre-determined length of time; and that there would be a mechanism to allow an exception condition to be reset, so that further occurrences of the condition be permitted to cause new notifications to be processed.

The process exception detection means of the present invention act as catalysts to regulate the processes that they monitor. Using distributed process and resource information, the event information is combined with the specific process for resolution, which is instantly delivered to responsible recipients anywhere. This enables the process exception detection means to initiate, within minutes, a "Red Flag" to the local and global business process owners when an exception occurs at a critical point in the supply chain. Organizations and the value networks in which they operate have the ability to respond proactively to both real-time exceptions as well as market trends through continuous process innovation.

Valuable quality and optimization tools are limited in their effectiveness by timely access to key data, both internally and at supplier locations. Organizations tend to rely on anecdotal data for key modeling metrics and optimization algorithms, because process data is either not available or due to latency, synchronizing or input accuracy not suitable for modeling or operational reliance.

Unplanned events in the supply chain and in particular unpredictable acts of nature, economic, or political changes have tremendous impact on modern time-critical value chains. The overwhelming availability of non-contextual information and data, through an array of proprietary applications, databases, portals and spreadsheets measurably affects knowledge workers.

Recognition of Distributed Processes

Unlike other traditional proprietary or point solutions that focus on event management of limited data sources, the process exception detection means of the present invention is designed for flexible monitoring, not control, of a broad range of source data—including but not limited to production equipment, environmental sensors, metrology/quality equipment, facilities sensors, applications, databases, and news feeds—independent of local infrastructures including communication and information systems. This provides the ability to monitor particular parameters relating to specific transactional as well as qualitative measures that are both intrinsic and extrinsic to the local and global processes. Some examples of the distributed processes in a supply chain environment include:

1. manufacturing process
2. management processes such as, marketing, logistics, accounting/tax, personnel, design/engineering, regulatory, and quality
3. environmental variables that impact quality
4. and the ability to create and "audit trail" of exceptions, communications and corrective actions across boundaries such as the corporate entity, language as well as technical.

Currently companies are limited by the ability of proprietary and other specific scope solutions allowing them to monitor and put into context certain limited aspects of the above, but not all simultaneously—and that we can monitor any of these, or any combination of these Supply chain Statistical Process Control (SPC) barriers prevent timely response and effective decision making in a proactive, as opposed to re-active, mode and lack adequate information. These barriers to decision making can be translated in terms of the need to deliver real-time information as opposed to data. Many process improvement initiatives are stalled or companies are unable to assess the true impact of these initiatives due to the lack of some key supply chain analytics required to measure operational performance and ongoing return on investment. The present invention builds on familiar continuous improvement concepts to identify and address shortcomings; for example Six Sigma advocates the measurement and monitoring of critical processes. The barrier has been the inability to identify critical processes in the supply chain and to monitor processes beyond the boundaries of the enterprise and the inability to relate measures to meaningful decision metrics, and ancillary information, that can be used to trigger remedial action. The process exception detection means of the present invention provides the ability to monitor and control metrics that pose an operational challenge to measure. The ability of the process exception detection means to identify key performance levers of inter-enterprise processes and provide that source information in the context of distributed processes forms the basis of a supply chain statistical process control and continuous improvement system.

Choice of the pre-specified situations, for which the process exception detection means should be programmed to react, will typically be ones for which if action is delayed (for example, until information about the situation becomes known via other means) significant negative impact will accrue. Examples would be responding to supply chain exceptions to avoid huge financial impacts, or responding to natural, or other, disasters affecting a manufacturing location allowing alternative arrangements to be made by customers.

In general, systems commonly produce 'events'—that is, when something that might or might not be interesting occurs. However, the number of these events can be huge—and it would be impossible for humans to be informed about each and every one of these events. Indeed, knowing about each of these events would not yield any useful information—it is just so much data. In contrast, there may be a few conditions (which might be as a result of specific events, but do not have to be) that are unusual, and would benefit from human involvement. Some of these conditions, if left undetected, or unreported, may have a significant financial impact on an organization. Thus, these conditions may be thought of as 'exceptions' (rather than 'events'). In addition, for a human to be able to react to such an exception requires that they have the appropriate context for being able to interpret the exception (that has occurred) and thence be able to determine an appropriate action to take as a result—this requires having some contextual information (such as a process document) to help them understand the exception in context. The process exception detection means of the present invention allows detection of specific exceptions, and reporting those exceptions to humans with the necessary context to allow them to take appropriate action. Many events can be associated with gradual more insidious changes in other variables. The present invention allows users to define exception conditions measure them identify correlations and operationally monitor theses exceptions as to predict or identify critical risk factors.

BRIEF SUMMARY OF THE INVENTION

It is an object of the present invention to be able to detect specific conditions in a manufacturing supply chain, and instantly inform relevant recipients, along with relevant context of that condition.

It is an object of the present invention to allow specification of particular conditions in a manufacturing supply chain for which timely notification of their occurrence would yield significant business advantage.

It is an object of the present invention to be able to configure specific process exception detection means to detect these chosen conditions in a manufacturing supply chain.

It is an object of the present invention to be able to have a process exception detection means inform a messaging controller of a condition, to allow the majority of the processing and context to be done remotely from the process exception detection means, and to allow the process exception detection means to be small and minimally invasive into the supply chain that it is monitoring.

It is an object of the present invention to be able to have a process exception detection means attach appropriate environmental information, such as supplementary information that can help characterize various aspects of the condition, in the exception that it transmits to the messaging controller It is an object of the present invention to be able to install, register, and configure a process exception detection means at each location in the supply chain that is to be monitored.

It is an object of the present invention to be able to install and configure a messaging controller in each enterprise that is interested in learning about the conditions in a particular manufacturing supply chain.

It is an object of the present invention to be able to be able to configure how the messaging controller should respond to each exception it is capable of receiving, in terms of the recipients who will be notified of the condition, and in each case the relevant (static) contextual information that will accompany the notification of the condition. Such contextual information might include sections of the relevant contract between supplier and customer, or a process document.

It is an object of the present invention to be able to send different contextual information to the different recipients who will receive a notification, so that each person can receive the context that is appropriate for understanding what they need to do as a result of the notification of the condition.

It is an object of the present invention to be able to be flexible with regard to the sorts of devices, objects, software, databases, etc. that a process exception detection means can be monitoring.

It is an object of the present invention to be able to deploy process exception detection code in a very small footprint, i.e., requiring minimal resources in an existing computer system, or requiring a minimal system (such as a small PDA) on which the process exception detection code will execute.

It is an object of the present invention to be able to be flexible with regard to the communications mechanisms that can be employed between process exception detection means and messaging controllers It is an object of the present invention to be able to be flexible with regard to the communications mechanisms that can be employed between messaging controllers and recipients.

It is an object of the present invention to be able to allow recipients to acknowledge receipt of notifications, indicating that the system no longer needs to try alternative communications paths to contact them.

It is an object of the present invention to be able to try alternative communications paths to contact recipients if they have not acknowledged receipt of the notification.

It is an object of the present invention to be able to escalate a notification if, after trying all communications paths to a person, they have not acknowledged receipt of the notification, so that others may take appropriate action in the absence of one person taking action.

It is an object of the present invention to be able to reset a process exception detection means' status of a condition, to allow future occurrences of the same condition to yield exception reports to the messaging controllers again.

It is an object of the present invention to be able to be flexible with respect to the means of detecting the conditions—whether by receiving an event stimulus from the device, object, software, or database; whether by polling (at a pre-specified interval) for information from the device, object, software, or database; whether by checking a complex combination of circumstances (such as a table of temperature and humidity conditions) to determine whether a condition needs to cause an exception; whether by checking a rolling average (e.g., the average quantity of the last three days' production); or whether by determining that the device, object, software or database is, for some reason, unavailable (e.g., due to power outages, software crashes, system faults, etc.).

It is an object of the present invention to be able to allow administration of the process exception detection means using web-based protocols (including, but not limited to HTTP).

It is an object of the present invention to be able to allow administration of the messaging controllers using web-based protocols (including, but not limited to, HTTP).

It is an object of the present invention to be able to permit appropriately authorized local operations personnel to modify the conditions within a process exception detection means that will cause an exception to be sent to a messaging controller.

The present invention has the following advantages:

flexibility in types of things to monitor (devices, objects, software, databases, etc.) relating to a manufacturing supply chain flexibility in the means by which the thing is monitored (e.g., via an API, via a hardware interface, etc.)

flexibility conditions to be monitored that would yield an exception, and permitting administrative control over the specific parameters to those conditions (e.g. temperate exceeds a value, administratively set to 70° F., or subsequently changed to 68° F. by an appropriately authorized administrator)

ability to send environmental information along with an exception—e.g., total number of previously completed printed circuit boards of a specific type, when a machine failure occurs small footprint—process exception detection code can execute on a device as small as a PDA, or an existing computer, and it doesn't use much system resources flexibility in communications methods between process exception detection means and messaging controller flexibility in communications methods between messaging controller and recipients to be notified ability to try alternative communications paths if one is unavailable ability for recipients to acknowledge receipt of a notification ability for the system to escalate a notification, where no acknowledgement has been received in a pre-determined time, to send a notification to an alternative person ability for appropriately authorized recipients to reset a process exception detection means relating to a specific condition, so that future occurrences of that condition can cause new exceptions and notifications to be sent ability to construct process exception detection means using a building block approach, with common components, operating system specific components, communications specific components, and information source specific components ability to load process exception detection code across the network, install them and register them to one or more messaging controllers ability to administer process exception detection means and messaging controllers via a web-based interface ability to communicate between process exception detection means and messaging controllers using XML formatted messages and the SOAP and HTTP protocols ability to communicate between messaging controllers and recipients using XML formatted messages and the SOAP and HTTP protocols ability for the process exception detection means and the messaging controllers to be operating under the auspices of different enterprises, each with their own security policies ability for communication between process exception detection means and messaging controllers to cross enterprise boundaries ability for communication between process exception detection means and messaging controllers to be secured via Secure Sockets Layer (SSL)—i.e., HTTPS disclosure of the contents of an exception message from a process exception detection means to a messaging controller, e.g., as it traverses the Internet, will not provide much useful information out of context ability for one process exception detection means to send exceptions to multiple messaging controllers ability of one messaging controller to send notifications to multiple users ability of one messaging controller to be associated with multiple process exception detection means ability for one messaging controller to be identified as the administrative messaging controller for each process exception detection means ability for a messaging controller to execute on a variety of operating system platforms and environments ability for a messaging controller to share computing resources—i.e., it does not require a dedicated system

DETAILED DESCRIPTION OF THE INVENTION

Figure 1:
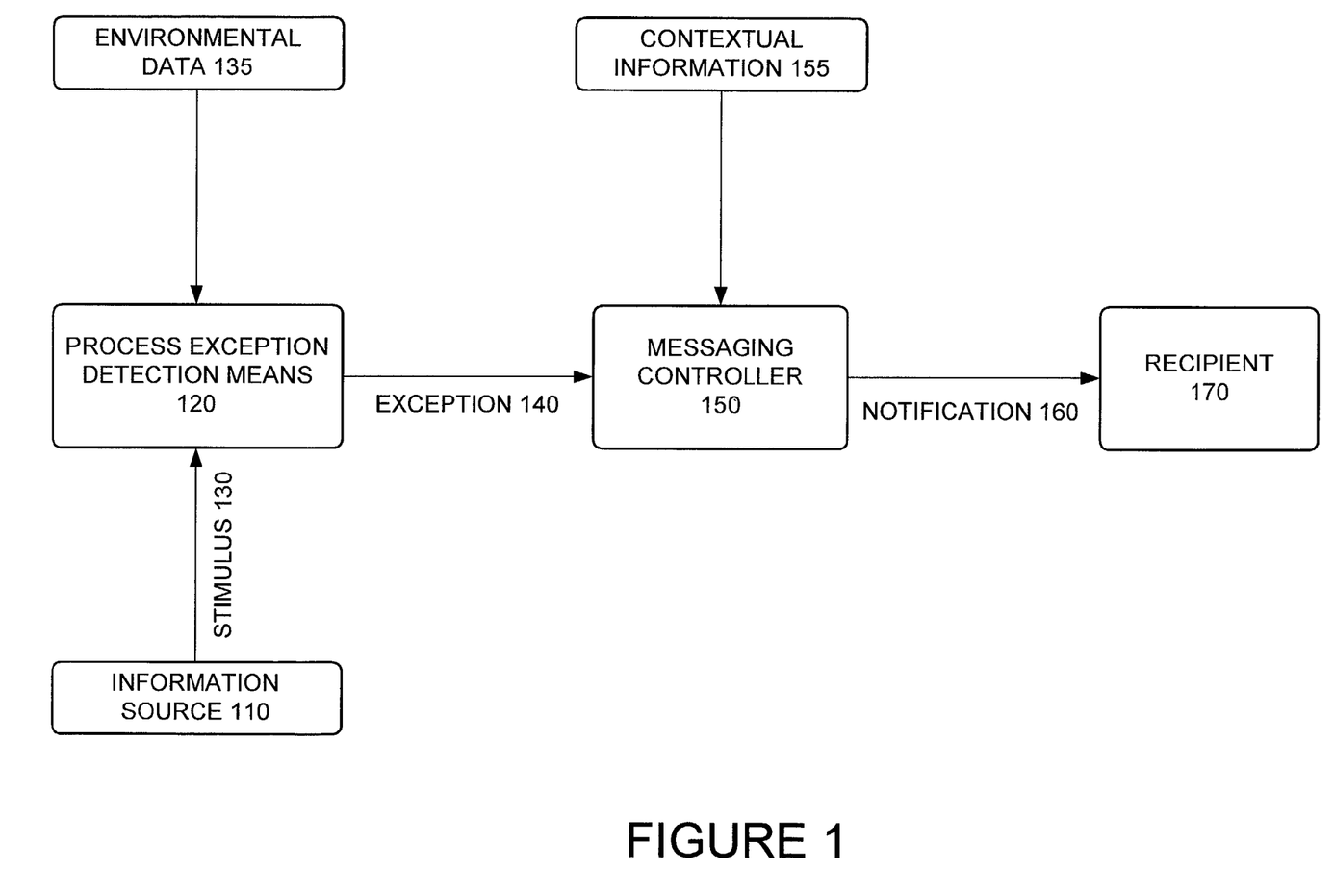
FIG. 1 illustrates a simplified model of the present invention.

As illustrated in FIG. 1, the information source 110 provides some "stimulus" 130 to the process exception detection means 120. The information source 110 can represent software (such as SAP or a news feed), a database, or a physical device (such as a manufacturing machine, a medical monitor, or a backup power supply). The information source 110 can provide the stimulus 130 directly, or the stimulus 130 can occur as a result of the process exception detection means 120 polling for some information from the information source 110.

The process exception detection means 120 determines whether the stimulus 130 is likely to be of interest—for example, by testing against a pre-defined condition (for example, if the temperature sensor indicates that the temperature is above 100° F.). If the process exception detection means 120 decides that the stimulus 130 is of interest, it packages information about the stimulus 130, along with any relevant environmental data 135 (e.g., information about the current item being built on the production line) that it may retrieve either from the information source 110, or other sources, and sends it as an exception 140 to a pre-defined messaging controller 150.

The messaging controller 150, on receiving the exception 140 from the process exception detection means 120, determines who should be informed of the situation, and then, together with contextual information 155 that will be used by the recipient of the information (e.g., a process document, or a check-list) packages up a notification 160 to send to a recipient 170.

Communication Alternatives

Communication between a process exception detection means 120 and the related information source 110 is very specific to the actual information source 110. For example, if the information source 110 is a software component, the communication might be via a pre-defined API. If the information source 110 is a database, the communication might be via SQL or a database API. In both these cases, the information source 110 and the process exception detection means 120 may be located in the same computer system. If the information source 110 is a device or machine, the process exception detection means 120 would likely be located on a separate computer system, and interface to the device or machine by some appropriate means (such as via a serial or parallel interface, a USB or FireWire interface, or via a Bluetooth or similar wireless connection).

Communication between the process exception detection means 120 and the messaging controller 150 can be most effective when both are connected to the same network (be it a local area network, or the Internet). However, alternative communications mechanisms such as modem, mobile phones, satellite, or pagers may be employed where a direct network connection is not feasible. The messages that effect communication between process exception detection means 120 and messaging controller 150 are XML messages, and the communication is defined using SOAP (Simple Object Access Protocol).

Communication between the messaging controller 150 and the recipient 170 to be notified is most effective when there is a direct network connection to the applications used by the recipient 170 (e.g., via a local area network, or the Internet). However, alternative communications mechanisms based on mobile phones, or alternative applications such as instant messaging, e-mail, or collaborative process applications may be used. Such communication can be most efficient when the notification 160 is made, and the concomitant contextual information 155 accessed via the recipient 170's regular applications—avoiding the need for the user to learn new tools and processes to be able to react appropriately to the stimulus that yielded the notification in the first place. The messages that effect communication between the messaging controller 150 and the recipient 170's application make use of XML, and SOAP (Simple Object Access Protocol).

Note that communications between the components defined above do not have to be under the auspices of the same enterprise. Thus the process exception detection means 120 and messaging controller 150 may be located in different enterprises (for example, to allow one customer to monitor the status of production within their contract manufacturer). Similarly the messaging controller 150 and the recipient 170 receiving the notification 160 may also be in different organizations (so that, for example, a customer can be informed of an unexpected situation in their supplier). As the communication between a process exception detection means 120 and a messaging controller 150, and between a messaging controller 150 and a recipient 170's application is defined using XML and SOAP, such messages can be transported using the HTTP and HTTPS protocol, and hence traverse each organization's firewall safely and securely.

Plurality of Components

Figure 2:
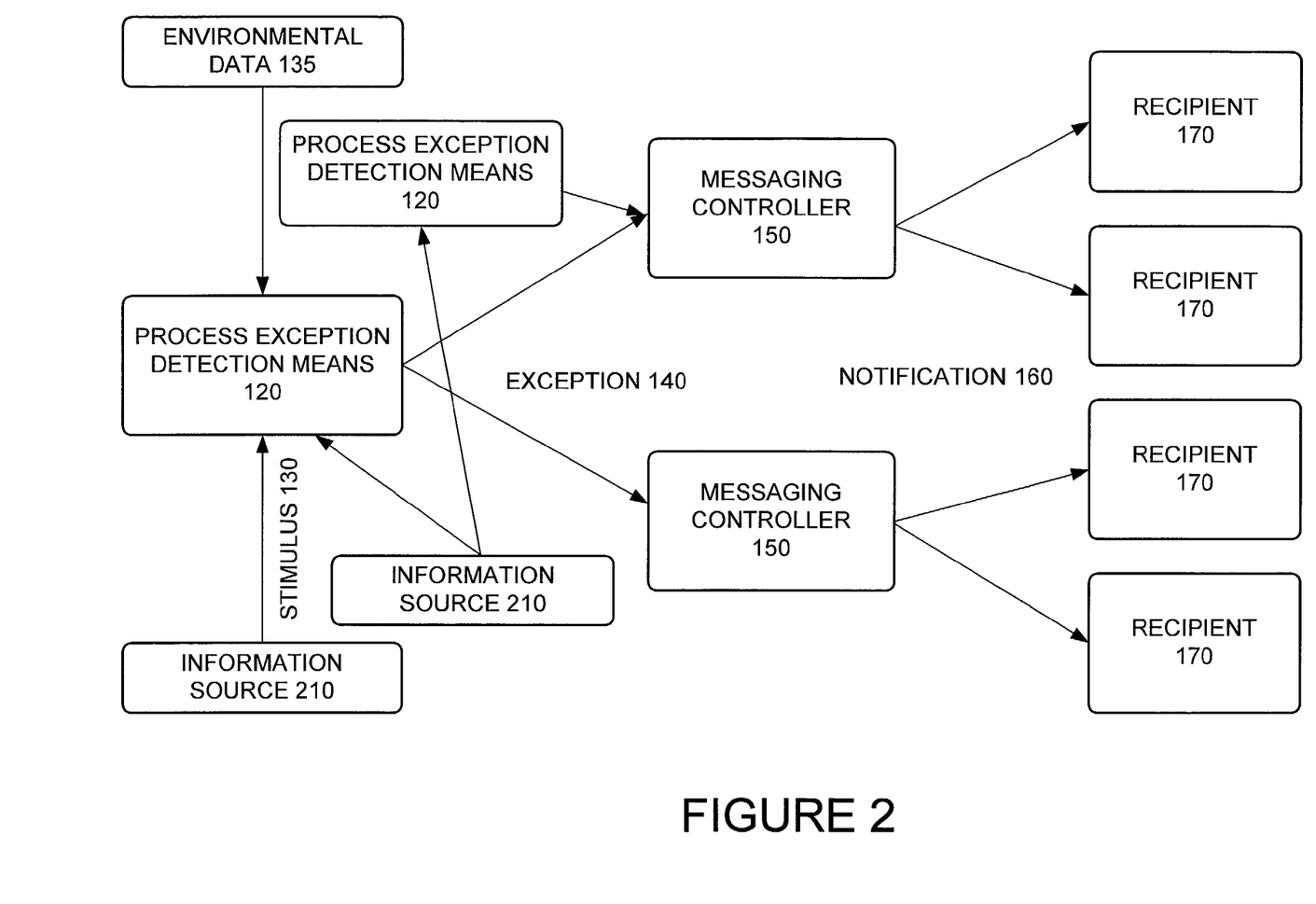
FIG. 2 illustrates a single Stimulus yielding multiple Exceptions & Notifications.

FIG. 2 shows how a single stimulus 230 from a single information source 210 yields multiple exceptions 240 (each to a different messaging controller 250) and each exception 240 yields multiple notifications 260 (each to a different person 270).

Within a fully functioning process exception detection means 220, there may be multiple information sources 210, multiple exceptions being monitored, multiple messaging controllers 250 and multiple persons 270 who will be receiving notifications 260. Each is considered in turn below.

Multiple information sources 210 can be monitored simultaneously, by one or more process exception detection means 220, in order to detect different conditions (for example, at different steps in a manufacturing production line, or for different devices being monitored).

A process exception detection means 220 can be configured to send multiple exceptions 240 for a single stimulus 230 to multiple messaging controllers 250—for example, one messaging controller 250 may be administered by the manufacturer that controls the information source 210, and another messaging controller 250 may belong to the company that the manufacturer is supplying. Note that for each process exception detection means 220, one messaging controller 250 is designated as the administering messaging controller, and is thus the only one via which resets of exceptions 240 (described later) can be initiated.

A messaging controller 250 can be configured to send notifications 260 for a single exception 240 to multiple recipients 270. Each notification 260 can be associated with different contextual information (as shown in FIG. 1), so that each person 270 receiving a notification 260 can receive associated information that is relevant to how they need to respond to the notification 260.

Monitoring Conditions

The conditions that define what a process exception detection means can detect as a stimulus are very flexible. And, in general, the parameters that control those specific conditions can be deployment-specific or environment-specific. Thus, the present invention allows considerable flexibility in the configuration of the process exception detection means.

The implementation of the specific process exception detection means that connects to a specific type of information source will define what conditions may be monitored. Similarly, the implementation of the specific process exception detection means will also define the amount of control and specificity that an administrator may employ in choosing what conditions will yield exceptions from the process exception detection means.

Some information sources are sufficiently sophisticated that they already define the conditions that yield an event report—in this case, the role of the process exception detection means is to respond to the event as a stimulus. Other information sources are passive, and require periodic monitoring (at a rate determined by the process exception detection means, which in turn may be under administrative control). When the process exception detection means polls the information source and retrieves a "value" for some variable or variables, the process exception detection means uses a predetermined administratively-set threshold to indicate when the stimulus has occurred, and therefore when to generate an exception (to be sent to a messaging controller).

The specification of the conditions that yield a stimulus are flexible. Examples include:

When X occurs . . .

Check X every <time period>; if X <relational op> <value>then . . .

Check X and Y, every <time period>; if X <relational op> <value1>and Y <relational op> <value2> then . . .

More complex conditions may also be permitted—for example, where a complex intersection of temperature and humidity values can be checked against a pre-defined table of acceptable combinatorial values—and an exception produced if the two values are together out of the permitted range.

Also, as well as being able to detect instantaneous values within an information source, the process exception detection means can be configured to look at smoothed values, where individual peaks or valleys in a monitored value are of less concern than averages over a period of time.

Additionally, a process exception detection means can also be configured to cause an exception where the information source does not respond for a pre-defined period of time.

Resetting Exceptions

When a process exception detection means detects a stimulus, and sends one or more exceptions to one or more messaging controllers, it maintains information about that condition in an Alert data structure.

The Alert data structure is maintained until it has been explicitly Reset—most likely as a result of an action by one of the recipients who receive a notification resulting from the original stimulus.

Each process exception detection means is configured to know about one specific messaging controller—the administering messaging controller. Resets to a process exception detection means must come via the administering messaging controller for that process exception detection means.

Resetting Notifications

When a messaging controller receives an exception and sends one or more notifications, it maintains information about each notification in a notification data structure.

Each notification data structure is maintained until the notification has been explicitly acknowledged as having been received by the person.

Note that, unlike the process exception detection means, which maintains a single Alert data structure relating to a single stimulus (and hence potentially multiple exceptions), the messaging controller maintains a distinct data structure for each notification, and each is individually acknowledged.

Escalation

If an exception (really an Alert data structure) is not reset, or if a notification is not acknowledged, then an escalation process occurs.

In the case of an exception, the escalation can yield an alternative exception (perhaps to another messaging controller), referring to the Alert data structure itself. (In this case, the process exception detection means is acting as its own information source for the Alert data structure). Additionally, the process exception detection means can be configured to provide some sort of local warning using whatever mechanism or mechanisms are defined by the host operating system on which the process exception detection means is executing.

In the case of a notification, the escalation can yield an alternative notification, either to the same person but via an alternative communications mechanism (e.g., pager) or to another person. Note that an alternative notification does not cause a new notification data structure to be created—the original data structure is used. As with the process exception detection means, the messaging controller can be configured to provide some sort of local warning using the host operating system.

Design of the Process Exception Detection Means

Figure 3:
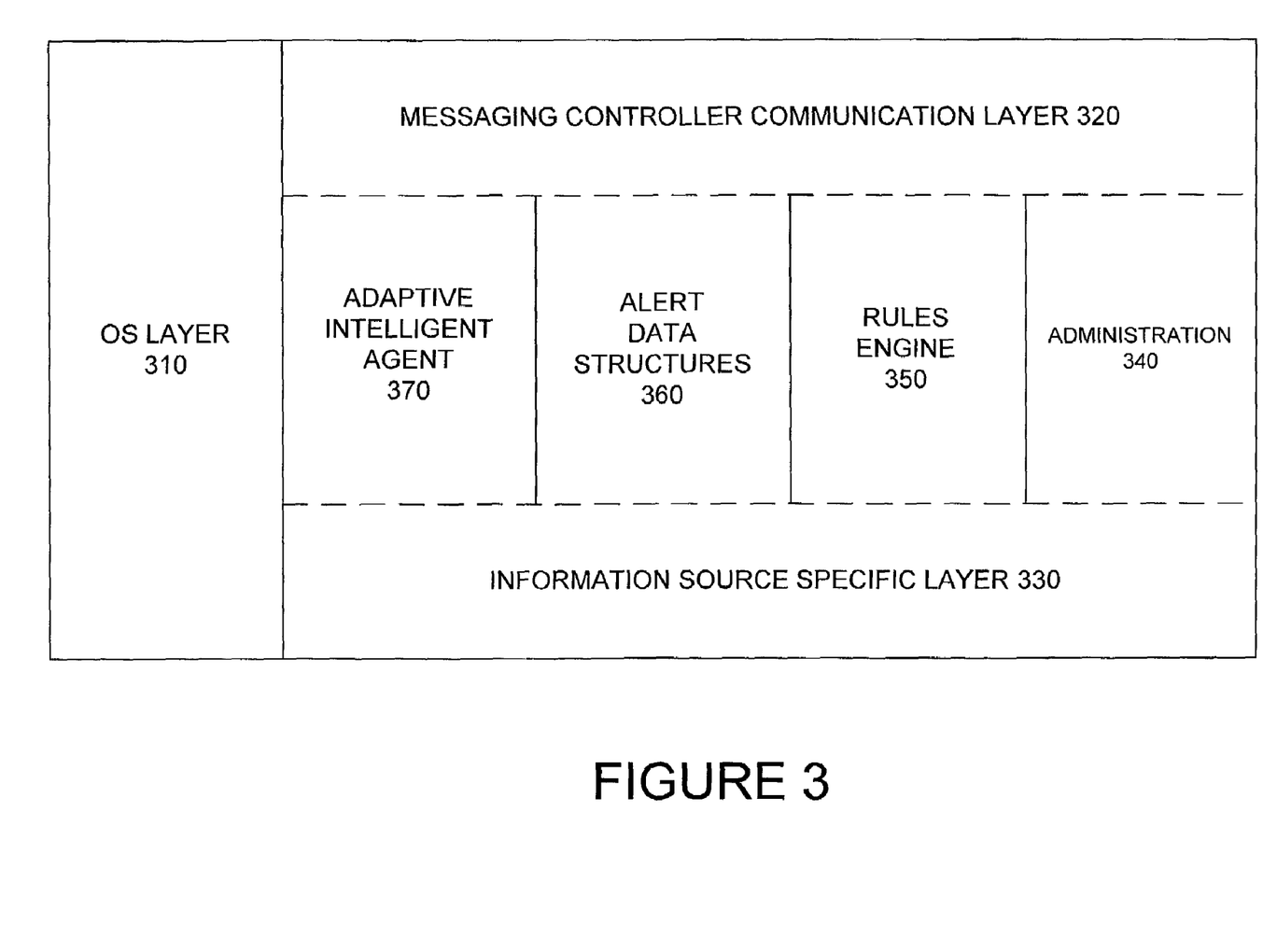
FIG. 3 illustrates sub-components of the process exception detection means.

The process exception detection means comprises a number of sub-components, as illustrated in FIG. 3:

The O/S layer 310 is responsible for communicating with the host operating system.

The Messaging Controller Communication layer 320 is responsible for communicating with the messaging controller (s), with different sub-layer components to allow for multiple communications mechanisms (e.g., Internet, satellite, pager, etc. The lower interface (shown as a dotted line) is standard; the upper interface is communications-mechanism specific.

The Information Source Specific layer 330 is responsible for communicating with specific information sources. The upper interface (shown as a dotted line) is standard; the lower interface is specific to the particular information source.

The Administration layer 340 is responsible for administration of the process exception detection, via commands from the administrative messaging controller. This includes specification of the conditions to cause a stimulus to be turned into one or more exceptions, along with the environmental information to be included in each exception, and the specification of the messaging controller(s) to receive the exceptions. Also the Administration layer 340 is responsible for resetting the Alert data structures created as a result of a stimulus causing one or more exceptions.

The Rules Engine layer 350 is responsible for defining the specific conditions within the information source that will yield an exception, as well as the concomitant environmental information and information about the messaging controllers to receive the exceptions when they occur.

The Alert Data Structure layer 360 is responsible for maintaining the Alert data structures for each stimulus that has yielded a unique exception to be sent to one or more messaging controllers The Adaptive Intelligent Agent layer 370 is used to maintain information from the information source to allow computation of smoothed data and data that is averaged over time periods. This layer also maintains an awareness of data over time, in order to adapt to the conditions, and to know when 'unusual' conditions have occurred—without requiring those conditions to have to be specific explicitly a priori.

Design of the Messaging Controller

Figure 4:
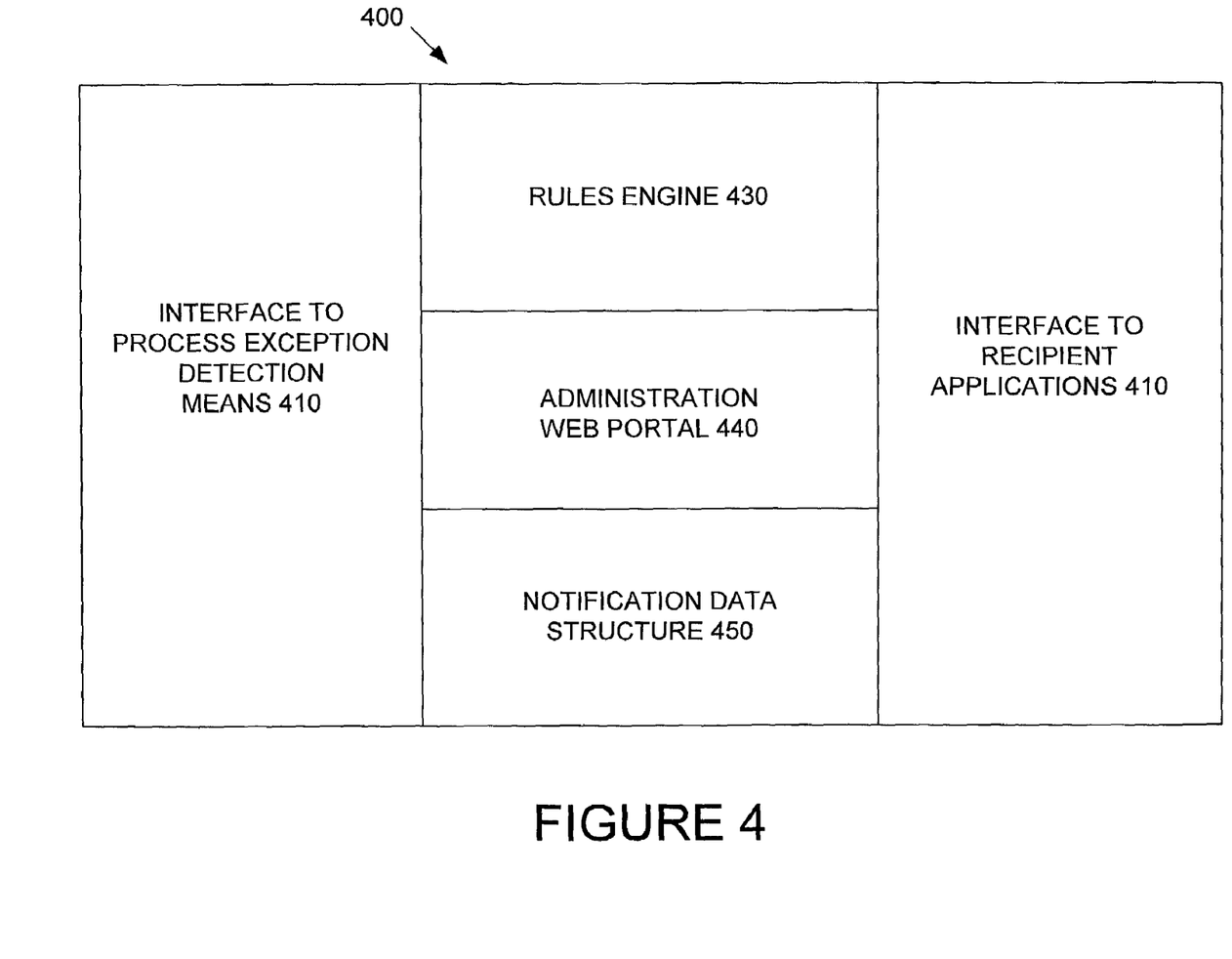
FIG. 4 illustrates sub-components of the messaging controller.

As illustrated in FIG. 4, the messaging controller comprises the following components:

Interface to process exception detection means 410 to receive exceptions.

Interface to recipients' applications 420 to send notifications.

Rules engine 430 to determine what notifications, with what contextual information, should be sent to what recipients' applications when exceptions are received.

Administration web portal 440 to provide administration of the messaging controller, and of the process exception detection means for which this messaging controller is identified as the administrating messaging controller, and to provide for resetting of Alert data structures in process exception detection means.

Notification data structure 450 maintains information about each notification.

Configuration & Registration

There are a number of steps involved in creating a working system, comprising one or more process exception detection means together with one or more messaging controllers to be able to monitor one or more information sources and be able to send notifications to one or more recipients.

Installation of a messaging controller involves installation of the messaging controller software application on an appropriate host; configuration of the messaging controller is via web (e.g., HTML) pages.

A process exception detection means or code appropriate to the type of information source is installed remotely via the web from a common library of process exception detection code. Once installed, the process exception detection means is registered with one messaging controller (as its administration messaging controller) and with other messaging controllers to which it might also send exceptions. Once registered, the process exception detection means is configured, via web (e.g., HTML) pages to determine the particular set of conditions for which a stimulus will yield an exception, along with the related environmental information to be sent with the exception, and identification of the specific messaging controller(s) to which the exception will be sent.

Administration

Administration of the process exception detection means and messaging controller(s) takes place using web (e.g., HTML) pages. A process exception detection means may only be administered via its administrative messaging controller.

For a messaging controller, the following describes some of the administrative operations that may be performed:

Enable/Disable the messaging controller.

Define one or more notifications that correspond to an exception from a registered process exception detection means, and for each notification, define the contextual information (document) that will accompany each notification and identify the person's application that will receive the notification.

Define one or more escalation conditions that correspond to each notification.

List the status of each notification, whether active or not, and whether escalated or not.

Acknowledge a notification as having been received, thus obviating any further escalation.

List the status of each process exception detection means that is registered to this messaging controller.

Display an audit trail, of administrative operations, exceptions, and notifications (including escalations) that have occurred recently.

For a process exception detection means, the following describes some of the administrative operations that may be performed from the administrative messaging controller:

Register the process exception detection means with its administrative messaging controller.

Enable/disable the process exception detection means.

Define the conditions that will yield a stimulus—whether as an event which is signaled by the information source, or whether as data which is retrieved from the information source. In the latter case, define the time period that the data will be polled.

Define the conditions that will yield an exception from a stimulus—by specifying the nature of the parameters that will be checked, and the value of the parameters that are considered worthy of reporting as an exception; define the environmental information that will accompany each exception, and identify the messaging controller(s) to which the exception will be sent.

Reset an Alert data structure, confirming that the condition that caused the original stimulus and exception has been acknowledged.

Some of the administrative operations that may be performed from any messaging controller to which the process exception detection means has been registered:

Display the status of the information source with which the process exception detection means is associated.

Display the communication status with respect to a messaging controller with which the process exception detection means is registered.

Display the status of an Alert data structure corresponding to a previously sent exception.

O/S Environments

The messaging controller can execute in the following environments:

Unix (various flavors)
Linux
Windows

The process exception detection means can execute in many, including limited memory, environments, such as:

Palm Pilot (an other similar PDAs, such as other Palm OS devices and PocketPC devices)
Windows
Unix (various flavors)
Linux The following represent various aspects of the present invention:

Machinery that detects conditions (stimuli) from a plurality of devices, systems, or software, sends exceptions to one or more messaging controllers which indicate the device/system/software instant, the stimulus, together with related environmental information, and one or more messaging controllers that receive exceptions and deliver notifications to one or more applications used by humans together with appropriate contextual information to aid the human in resolving the problem identified by the original condition.

Appropriate process exception detection code for running on various devices can be downloaded via the Internet from a library of process exception detection code—selecting the appropriate process exception detection code that interfaces in the desired way to the corresponding information source or sources.

Process exception detection means register themselves with their administrative messaging controller for the purpose of establishing an administrative path from messaging controller to process exception detection means, and with a plurality of messaging controllers for the purpose of allowing the subsequent transmission of exceptions.

Process exception detection means can utilize a plurality of mechanisms to access information about, or events from, specific information sources, including, but not limited to, specific APIs, specific database access methods, RS232 serial line connections, parallel connections, USB (Universal Serial Bus) connections, IEEE1394(FireWire) connections, Bluetooth connections. Process exception detection means can utilize a plurality of mechanisms to communicate with messaging controllers, including, but not limited to, Internet connections (via TCP/IP), modem, mobile phone communication, satellite communication.

Messaging controllers can utilize a plurality of mechanism to alert humans to the conditions detected, including, but not limited to, Internet connections (via TCP/IP), modem, mobile phone communication, satellite communication, pager communication, phone/voicemail communication. Communication between process exception detection means and messaging controllers can be wholly within an enterprise's security perimeter, or it can be across enterprises.

An organization may deploy multiple process exception detection means, each detecting similar or different conditions, to provide information for multiple 'clients' (such as a contract manufacturer hosting process exception detection means for each of its customers, so that those customers may monitor specific conditions relating to the products they are being supplied).

Process exception detection means provide limited information exposure to enterprise partners—they do not require or provide access to a complete database that might include competitive or proprietary information. Instead the only information that is transmitted from a process exception detection means to a messaging controller (e.g., in a different enterprise) is the exception, including any pre-defined relevant environmental information. Exception messages contains the minimum of information (the stimulus that caused the exception, along with relevant environmental information) such that disclosure of this data to unauthorized sources will yield little useful information out of context. Process exception detection means can be developed independent of the specific operating system on which they can execute (thus supporting environments like PalmOS, PocketPC, Windows, Linux, Unix, etc.)

Communication between process exception detection means and messaging controller (exceptions) is defined via XML (eXtended Markup Language) and SOAP (Simple Object Access Protocol) and is transmitted via HTTP (HyperText Transport Protocol) or HTTPS (HTTP secured with SSL—Secure Socket Layer). Communication between messaging controller and the user (notifications) is defined via XML (eXtended Markup Language) and SOAP (Simple Object Access Protocol) and is transmitted via HTTP (HyperText Transport Protocol) or HTTPS (HTTP secured with SSL—Secure Socket Layer).

Communication of a notification to a user, can be escalated where there has been no positive acknowledgement of such communication, using a pre-defined sequence of communications methods, for example: Internet, wireless, modem, satellite, pager. Where a process exception detection means is unable to transmit an exception to a messaging controller, it can employ a pre-defined sequence of communications methods, for example: Internet, modem, satellite. When a process exception detection means is unable to communicate for an extended period of time with one or more messaging controllers, local messages may be delivered to alert local operations personnel of the situation.

Where a messaging controller is unable to communicate for an extended period of time with one or more messaging controllers, local messages may be delivered to alert local operations personnel of the situation. Administration of a process exception detection means is accomplished via web (e.g., HTTP) pages via the designated messaging controller. Administration of a messaging controller is accomplished via the web (e.g., HTTP) pages by suitably authorized users.

An Alert data structure maintained by a process exception detection means, corresponding to a stimulus that has yielded one or more exceptions, is reset via a web-based (e.g., HTTP) interface in the process exception detection means, allowing a subsequent stimulus to generate a new exception (and a new Alert data structure, which in turn will need to be reset). A notification data structure maintained by a messaging controller, corresponding to a single notification, is acknowledged via a web-based (e.g., HTTP) interface or an IVR (interactive voice response) system to the messaging controller.

The API (application programming interface) between the internal components of the process exception detection means (Administration, Rules Engine, Alert Data Structures, Adaptive Intelligent Agent) and the Messaging Controller Communication Layer is predefined, and independent of any specific communication component in that communication layer. The API between specific communication components in the Messaging Controller Communications Layer and the networking software that implements that communications is appropriate to that communications component and is not standardized. The API (application programming interface) between the internal components of the process exception detection means (Administration, Rules Engine, Alert Data Structures, Adaptive Intelligent Agent) and the Information Source Specific Layer is pre-defined, and independent of any specific information source.

The API between specific Information Source Specific Layer and its corresponding Information Source is appropriate to that information source and is not standardized. Communication between process exception detection means and messaging controller is preferably implemented using Jabber messaging (IVR), based on the Open Source implementation.

Information sources can be public information sources, such as news feeds, as well as private sources such as machines, sensors, metrology equipment, or just about anything with some kind of RS-232 output. The process exception detection code can be put on anything as small as a Palm Pilot, or it could be put on a machine controller. The present invention can also monitor databases and other applications. It can monitor systems, whether a system did a batch, whether a system did or did not do a batch update as it was supposed for re-planning, etc.

The architecture is modular so that it has a very lightweight, small footprint monitor that can monitor these information sources and send out a signal via different modes of communication. The communication can escalate up from the local network to a modem, to a mobile link, to even a satellite (it costs about $1500 to put the satellite-link on the roof of a building). The satellite link is desirable where the local communication infrastructure is poor. Paging is a last resort, paging someone locally to report a problem communicating with the messaging controller. The present invention can therefore be set so that it will cycle through different modes of communication that are pre-determined. For example, it could try the network connection first, if it can't get through on the network, it could try modem connection, if it can't get through on the modem connection, it could try a mobile connection or RF connection, and finally, it could try to send it out through a satellite link. If, for example, after 3 tries, it could send out a pager notice to recipients locally that there is something wrong with the communications links.

Although disclosed as sending notifications to recipients, the present invention can also send notifications to applications.

Once the information is put in context as a notification with final addressee, the messaging controller can escalate through multiple modes of communication to try to get the message out, including the prior communication means used for exceptions, taking advantage of technology like IVR (integrated voice response) so notifications can reach those who aren't hooked up to the latest technology. Notification through an IVR allows recipients to confirm that they received the message. The escalation of sending the final message out is done in a way that the critical recipients have the requirement of confirming that they've got the message and if they don't confirm the message, the present invention can send it to an alternate person.

The present invention has numerous applications.

EXAMPLES

During the 2001 power failures in California, the appropriate personnel did not get notified that a division lost power. Although uninterrupted power supplies (UPSs) kept things going, the division lost power without backing up critical data 5 hours after the initial loss of the power, when all their UPS went down. The present invention could have been used to monitor UPSs and notify personnel to back up critical data after a power interruption was detected.

Figure 5:
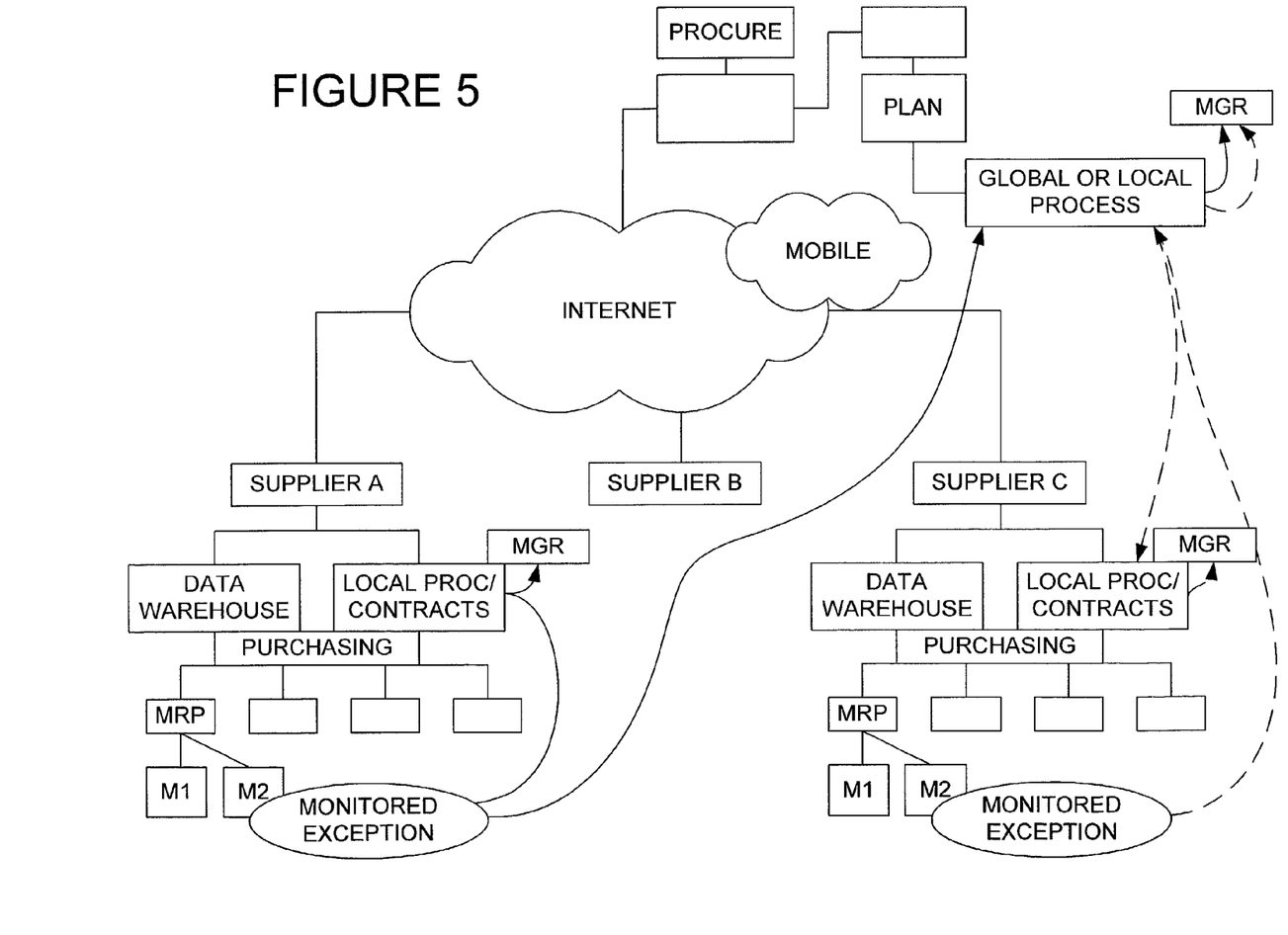
FIG. 5 illustrates an overall schematic view of the present invention.

Computer manufacturers are particularly interested in responding to things like the last Taiwanese earthquake that really impacted their business, because they are increasingly relying on just-in-time manufacturing and inventory. When major events like earthquakes occur, decision making often becomes paralyzed, or worse, it's done in panic or ignorance. Recipients don't have the information. The converse is when too many things are monitored, resulting in information glut without contextual information needed for proper decision-making. Typical real-time systems are dependent upon integration of all the applications, which could take weeks. The present invention is instantaneous because it is only dependent on detection of a change of state, notification of only time critical information, and doing it independent of the local infrastructures. In the event of an earthquake, the present invention, as shown in FIG. 5, sends out a signal directly to the local process owner in context of their process and how to resolve it. It may, at the same time—depending on how it's configured—send a signal to the manufacturer's quality manager in context of their process (see continuous line). The same exception can have different responses from different recipients, such as if supplier A's machine go down while it is manufacturing components for Dell, Compaq, and HP on that machine, the present invention can check the contracts to see who the supplier has the most penalties with for not shipping on time. The same exception could be sent to Dell, whose system is configured to look for alternative suppliers.

Further Modifications

UDDI (Universal Description, Discovery and Integration) may be used to describe the XML and SOAP message formats employed by Digital Enzyme (UDDI is a set of specifications for creating XML-based directories of Web services offerings. Users and applications may discover and locate web services through these directories much as callers consult Yellow Pages for telephone numbers.).

WSDL (Web Services Description Language) may be used (WSDL is a common framework for describing tasks performed by a Web service. For example, suppliers can discover what kind of information is offered by a company's inventory system—whether it indicates only when inventory approaches zero or also indicates possible due dates.).

Various methods may be employed for process exception detection means to interface to the web server on that machine—specifically, for one system to support multiple, potentially independent, process exception detection means on one machine. Various web servers should interface with a process exception detection means.

Various methods may be employed for the messaging controller (or multiple messaging controllers) to interface to the web server on that machine—specifically, for the data path and method used to distinguish multiple messaging controllers on one machine. Various web servers should interface with a messaging controller interface or the messaging controller could also contain its own web server.

The SOAP messages may be transported via HTTPS (port 443) as well as the standard HTTP (port 80) by any known means. An organization might ensure that only HTTPS can be used (to prevent unintentional disclosure of information to $3^{rd}$ parties) where traffic might flow on the Internet, by any known means.

Components of a process exception detection means may also have an internal calendar—in order that they might distinguish weekdays from weekend days, and to identify holidays.

Although disclosed for supply chain systems, the present invention is transportable to other industries since the technology is not industry specific. Other applications include government, finance, healthcare (medical response, pharmaceutical trials), project management, property/facilities management, agriculture, business continuity, and personal security.

I claim:

1. A method for using process exceptions to provide a notification for a distributed process, comprising:
   identifying a process;
   determining a location of a critical point in the identified process;
   determining an information source at the critical point in the identified process;
   monitoring stimulus from the information source;
   processing said stimulus to detect at least one process exception to the identified process;
   communicating the process exception to a messaging controller over a communication mechanism;
   processing the process exception at the messaging controller to automatically determine a recipient to receive a notification of the process exception and associated recipient-specific contextual information;
   communicating the notification of the process exception and the associated recipient-specific contextual information to the recipient; and
   when the communication of the process exception to the messaging controller is not acknowledged, communicating the process exception to the messaging controller over an alternative communication mechanism;
   wherein monitoring stimulus from the information source and communicating the process exception over the alternative communication mechanism are accomplished independent of local communication and information systems infrastructures of the identified process.

2. The method for using process exceptions to provide a notification for a distributed process of claim 1, wherein identifying a process comprises identifying a supply chain process.

3. The method for using process exceptions to provide a notification for a distributed process of claim 1, further comprising providing a local warning of the process exception at the location of the critical point in the identified process.

4. The method for using process exceptions to provide a notification for a distributed process of claim 1, further comprising selecting the communication mechanism and alternate communication mechanism from the group consisting of a local area network, Internet, modem, mobile phone, satellite, and pager.

5. The method for using process exceptions to provide a notification for a distributed process of claim 1, wherein communicating the notification of the process exception and the associated recipient-specific contextual information to the recipient further comprises an escalation process when the notification of the process exception is not acknowledged, wherein the escalation process is selected from the group consisting of communicating the notification of the process exception and the associated recipient-specific contextual information to the recipient over another communication means and communicating the notification of the process exception and the associated recipient-specific contextual information to an alternate recipient.

6. The method for using process exceptions to provide a notification for a distributed process of claim 1, wherein the identified process is a supply chain process and the information source is selected from the group consisting of production equipment, environmental sensors, metrology equipment, quality equipment, applications, databases, and news feeds.

7. The method for using process exceptions to provide a notification for a distributed process of claim 1, wherein the identified process is a supply chain process selected from the group consisting of a manufacturing process, a marketing process, an accounting process, a tax process, a personnel process, a design process, an engineering process, a regulatory process, a quality process, and an environmental variable that impacts quality of a process.

8. A system for using process exceptions to provide a notification for a distributed process, comprising:
   means for monitoring stimulus from an information source at a critical point in an identified process;
   means for processing said stimulus to detect at least one process exception to the identified process;
   a messaging controller;
   means for communicating the process exception to the messaging controller over a communication mechanism;
   means for processing the process exception at the messaging controller to automatically determine a recipient to receive a notification of the process exception and associated recipient-specific contextual information; and
   means for communicating the notification of the process exception and the associated recipient-specific contextual information to the recipient;
   wherein when the communication of the process exception to the messaging controller is not acknowledged, the means for communicating the process exception to the messaging controller comprises an alternative communication mechanism; and
   wherein the means for monitoring stimulus from the information source and the alternate communication mechanism are independent of local communication and information systems infrastructures of the identified process.

9. The system for using process exceptions to provide a notification for a distributed process of claim 8, wherein the process is a supply chain process.

10. The system for using process exceptions to provide a notification for a distributed process of claim 8, further comprising means for providing a local warning of the process exception at the location of the critical point in the identified process.

11. The system for using process exceptions to provide a notification for a distributed process of claim 8, wherein the communication mechanism and alternate communication mechanism are selected from the group consisting of a local area network, Internet, modem, mobile phone, satellite, and pager.

12. The system for using process exceptions to provide a notification for a distributed process of claim 8, wherein the means for communicating the notification of the process exception and the associated recipient-specific contextual. information to the recipient further comprises a means for escalation when the notification of the process exception is not acknowledged, wherein the means for escalation is selected from the group consisting of means for communicating the notification of the process exception and the associated recipient-specific contextual information to the recipient over another communication means and means for communicating the notification of the process exception and the associated recipient-specific contextual information to an alternate recipient.

13. The system for using process exceptions to provide a notification for a distributed process of claim 8, wherein the identified process is a supply chain process and the information source comprises a source selected from the group consisting of production equipment, environmental sensors, metrology equipment, quality equipment, applications, databases, and news feeds.

14. The system for using process exceptions to provide a notification for a distributed process of claim 8, wherein the identified process is a supply chain process selected from the group consisting of a manufacturing process, a marketing process, an accounting process, a tax process, a personnel process, a design process, an engineering process, a regulatory process, a quality process, and an environmental variable that impacts quality of a process.

\* \* \* \* \*